(12) United States Patent
Hattori et al.

(10) Patent No.: US 9,297,462 B2
(45) Date of Patent: Mar. 29, 2016

(54) SWITCH VALVE

(75) Inventors: Yuji Hattori, Gotenba (JP); Tomokazu Inagawa, Susono (JP); Kenta Kimura, Susono (JP); Takafumi Inagaki, Susono (JP); Yu Nagasato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 68 days.

(21) Appl. No.: 14/236,783

(22) PCT Filed: Aug. 3, 2011

(86) PCT No.: PCT/JP2011/067732
§ 371 (c)(1),
(2), (4) Date: Feb. 3, 2014

(87) PCT Pub. No.: WO2013/018203
PCT Pub. Date: Feb. 7, 2013

(65) Prior Publication Data
US 2014/0182722 A1   Jul. 3, 2014

(51) Int. Cl.
*F16K 11/07* (2006.01)
*F16K 3/24* (2006.01)
(Continued)

(52) U.S. Cl.
CPC ............ *F16K 11/0716* (2013.01); *F16H 61/00* (2013.01); *F16K 3/246* (2013.01); *F16K 11/02* (2013.01); *F16K 11/0712* (2013.01); *F15B 13/0402* (2013.01); *Y10T 137/8671* (2015.04)

(58) Field of Classification Search
CPC . F16K 11/0716; F16K 11/02; F16K 11/0712; F16K 3/246; F16H 61/00; Y10T 137/8671; Y10T 137/86574; Y10T 137/8659; Y10T 137/8667; Y10T 137/86686; Y10T 137/86694; Y10T 137/86702; Y10T 137/87917; F16B 13/0402; F16B 13/0401; F16B 13/0842

USPC ............... 137/625.2, 625.61, 625.69, 625.25, 137/625.27, 625.67, 625.68, 613, 565.11
See application file for complete search history.

(56) References Cited

U.S. PATENT DOCUMENTS 2,837,148 A   6/1958   Jay
2,971,090 A   2/1961   Piet et al.
(Continued)

FOREIGN PATENT DOCUMENTS

DE   31 09 285 A1   9/1982
FR   2 265 685 A1   10/1975
(Continued)

OTHER PUBLICATIONS

International Search Report issued Oct. 18, 2011 in PCT/JP2011/067732.
(Continued)

*Primary Examiner* — Michael R Reid
(74) *Attorney, Agent, or Firm* — Oblon, McClelland, Maier & Neustadt, L.L.P.

(57) ABSTRACT

A switch valve which is configured such that a plurality of land sections and a valley section between the land sections are formed in a valve element that advances or retreats in an axial direction according to a manual operation, a plurality of port sections opened are provided in a cylinder section in which the valve element is inserted so as to be capable of advancing and retreating, and the prescribed port sections are made to communicate with each other via the valley section according to a position of the valve element in the axial direction or be blocked by the land section, the switch valve includes a seal section that seals a space between portions on both sides in the axial direction across either one of the land sections in a liquid-tight manner.

6 Claims, 6 Drawing Sheets

(51) Int. Cl.
    *F16K 11/02*     (2006.01)
    *F16H 61/00*     (2006.01)
    *F15B 13/04*     (2006.01)

(56) References Cited

U.S. PATENT DOCUMENTS

| | | | | |
|---|---|---|---|---|
| 4,574,687 | A | * | 3/1986 | Kauss et al. .................... 91/461 |
| 5,342,246 | A | * | 8/1994 | Mori ................................ 474/1 |
| 5,992,294 | A | * | 11/1999 | Seddon ........................... 91/433 |
| 2007/0113906 | A1 | | 5/2007 | Sturman et al. |
| 2007/0131291 | A1 | * | 6/2007 | Lee .......................... 137/625.69 |

FOREIGN PATENT DOCUMENTS

| | | |
|---|---|---|
| JP | 50-022322 A | 3/1975 |
| JP | 57-117477 U | 7/1982 |
| JP | 59-108870 U | 7/1984 |
| JP | 61-85775 U1 | 6/1986 |
| JP | 04-138167 | 12/1992 |
| JP | 2005-090635 A | 4/2005 |

OTHER PUBLICATIONS

Office Action issued Jul. 8, 2014 in JP Patent Application No. JP2013-526684 (partial English translation only).

* cited by examiner

SWITCH VALVE

TECHNICAL FIELD

The present invention relates to a switch valve for switching paths that supply or discharge a hydraulic fluid such as hydraulic oil and particularly to a switch valve that switches ports to be opened or closed by moving a spool type valve element in an axial direction.

BACKGROUND ART

As an example of such a kind of valve, Japanese Patent Application Publication No. 2005-90635 (JP 2005-90635 A) discloses an example of a manual valve that is used in an automatic transmission for a vehicle. According to the disclosure of JP 2005-90635 A, the manual valve is a spool valve element and housed in an interior of the body where a plurality of oil passages are formed so as to be capable of reciprocal movement, and a large diameter section that corresponds to a land and a tapered section whose maximum outer diameter is equal to the large diameter section are formed in the spool valve element. The spool valve element is configured to synchronously advance or retreat with a shift lever and open or close the appropriate oil passage according to a position in an axial direction.

In such a valve that allows the valve element to advance or retreat in the axial direction to open or close the oil passages or switches communication states between the oil passages as the above manual valve, an inner peripheral surface of a cylinder section which houses the valve element and on which a plurality of ports open functions as a guide for advance and retreat of the valve element. Further, as disclosed in above JP 2005-90635 A, pressing force or tensile force is applied to one end section of the valve element in the axial direction. Accordingly, if an outer peripheral surface of the valve element closely contacts the inner peripheral surface of the cylinder section, frictional force therebetween becomes large. In addition, if a so-called inclination occurs to the valve element when force is applied to move the valve element in the axial direction, valve sticking in which the valve element is stuck on the inner peripheral surface of the cylinder section occurs with high possibility. Moreover, because the valve body including the above manual valve in the automatic transmission is housed in an interior of an oil pan, oil that leaks from the valve body returns to the oil pan and does not leak to the outside. Thus, the valve of an above so-called spool type is configured to be provided with a slight gap between the outer peripheral surface of the valve element and the inner peripheral surface of the cylinder section and allows the valve element to smoothly advance and retreat while allowing leakage of the oil via the gap. In other words, a conventional switch valve of the spool type is configured to include a function of opening and closing the oil passages but to allow a hydraulic fluid to leak.

Meanwhile, the switch valve such as the above manual valve may be used to supply a hydraulic fluid such as hydraulic pressure to a prescribed actuator. In such a case, although the hydraulic fluid supplied from a hydraulic pressure source such as a hydraulic pump passes through the switch valve, if the switch valve is the valve of the so-called spool type, a portion of the hydraulic fluid leaks from a gap between the valve element in the switch valve and the cylinder section that houses the valve element. In other words, a portion of the hydraulic fluid that is produced by using power is lost, and such leakage of the hydraulic pressure may become a degrading factor of energy efficiency. Further, in a case where so-called shut-in control in which the oil passage for the actuator supplied with the hydraulic fluid is closed to shut in the hydraulic fluid is performed in order to maintain a prescribed operational state, if the above-described manual valve is interposed in the oil passage on a shut-in side, the shut-in control is not achieved due to leakage of pressure from the manual valve, pressure is required to be continuously supplied along with that, and as a result fuel efficiency of the vehicle may be degraded.

SUMMARY OF THE INVENTION

The present invention has been made in consideration of above technical problems, and an object thereof is to provide a switch valve that can achieve smooth movement of a valve element in an axial direction and certainly restrict leakage of pressure.

To achieve the above object, the present invention provides a switch valve which is configured such that a plurality of land sections and a valley section between the land sections are formed in a valve element that advances or retreats in an axial direction according to a manual operation, a plurality of port sections opened are provided in a cylinder section in which the valve element is inserted so as to be capable of advancing and retreating, and the prescribed port sections are made communicate with each other via the valley section according to a position of the valve element in the axial direction or be blocked by the land section, the switch valve including a seal section that seals a space between portions on both sides in the axial direction across either one of the land sections in a liquid-tight manner.

The seal section may be provided in each of the two land sections that define the valley section. In a state where the one seal section of the seal sections seals a gap between one of the land section provided with the one seal section and the cylinder section in a liquid-tight manner, the other seal section is configured to seal a gap between the other land section provided with the other seal section and the cylinder in a liquid-tight manner.

An input port and an output port may be provided that open to the valley section in a state where the seal sections seals the gaps between the respective land sections and the cylinder section in a liquid-tight manner. A hydraulic pressure source may be connected to the input port, and a forward travel engagement device or a reverse travel engagement device for a vehicle may be connected to the output port.

The port sections in the present invention may include an output port that supplies hydraulic pressure to a forward travel engagement device or a reverse travel engagement device and an input port that introduces the hydraulic pressure of a hydraulic pressure source, the land sections may include two land sections that define a valley section that allows both the input port and the output port to open, and the seal section may be configured to seal gaps between the two land sections and the cylinder section in a liquid-tight manner in a state where both the input port and the output port are allowed to open to the valley section.

Further, the seal section in the present invention may include: an annular valve seat that protrudes from an inner peripheral surface of the cylinder section toward a central section of the cylinder section; and a contact section that is pressed to the valve seat to tightly fit thereon in a liquid-tight manner when the valve element moves in the axial direction and is formed in the land section.

Meanwhile, the valve seat in the present invention may be configured with a ring-shaped member made of an elastic material.

Alternatively, the valve seat and the contact section in the present invention may include respective tapered surfaces that tightly fit on each other.

In addition, the valve element in the present invention may include a shaft section on which the land section is mounted and which can relatively move with respect to the land section in the axial direction, and the land section may be mounted on the shaft section such that the land section can move from a prescribed limit position in the shaft section in one direction in the axial direction and cannot move from the limit position in the other direction.

Further, the seal section in the present invention may include a seal ring that contacts an inner peripheral surface of the cylinder section in a liquid-tight manner by elastic force that acts to increase an outer diameter, and the port sections may include an outer diameter restriction section that contacts at least two portions of an outer peripheral surface of the seal ring that face each other in a diameter direction and maintains the outer diameter of the seal ring to an inner diameter of the cylinder or smaller.

In the present invention, the output port may include a forward travel port that communicates with the forward travel engagement device and a reverse travel port that communicates with the reverse travel engagement device, the seal section may be configured to seal the gaps between the two land sections and the cylinder section in a liquid-tight manner in a state where either one of the forward travel port and the reverse travel port and the input port are both allowed to open to the valley section, the valve element may be configured to be moved to a position where both the forward travel port and the input port are allowed to open to the valley section and a position where both the reverse travel port and the input port are allowed to open to the valley section, and a supply-discharge oil passage, which has a supply valve that makes the input port communicate with the hydraulic pressure source and be blocked against the hydraulic pressure source and a discharge valve that makes the input port communicate with a drain portion and be blocked against the drain portion, may communicate with the input port.

The switch valve in the present invention is configured such that the valve element housed in the cylinder section so as to be capable of advancing and retreating in the axial direction includes the land sections and the valley section between the land sections, and the port sections that open on the inner peripheral surface of the cylinder section communicate with each other via the valley section or are closed by the land sections. The seal section is provided to isolate the sections on both of the sides in the axial direction across either one of the land sections from each other in a liquid-tight manner. Therefore, according to the present invention, in a case where a hydraulic fluid such as hydraulic oil that is supplied to any of the port sections is supplied from the other port section to a prescribed portion, leakage of the hydraulic fluid from a gap between the valve element and the cylinder section can be prevented or restricted.

Further, in the present invention, in a case where the input port and the output port that are formed in the cylinder section communicate with each other via the valley section, the seal section seals the gaps between each of the two land sections that define the valley section and the inner peripheral surface of the cylinder section in a liquid-tight manner. Accordingly, leakage of the hydraulic pressure that is supplied from the input port and output from the output port to a prescribed portion can certainly be prevented or restricted. As a result, for example, so-called shut-in control in which the hydraulic pressure is shut in a prescribed apparatus that communicates with the output port to maintain a prescribed operational state can be performed, and unnecessary energy consumption can be restricted.

The seal section in the present invention can be configured to presses the contact section formed in the land section to the valve seat formed in the cylinder section and to thereby seal the space between the portions on both of the sides in the axial direction across the land section. In such a configuration, a sealed state can be achieved at a so-called stroke end of the land section.

Further, the valve element in the present invention can include the shaft section that can relatively move with respect to the land section. In such a configuration, the shaft section that receives external operational force relatively moves with respect to the land section that has achieved a liquid-tight state. Therefore, contents of a manual operation can be detected or determined on the basis of a position of the shaft section.

In addition, the seal section in the present invention can be configured with the seal ring that slidably contacts the inner peripheral surface of the cylinder section by elastic force. In such a case, the port sections partially open with respect to the inner peripheral surface of the cylinder section, and the outer diameter restriction section is provided that contacts at least two portions of the outer peripheral surface of the seal ring that face each other in the diameter direction. As a result, the outer diameter restriction section restricts an increase in the diameter of the seal ring by the elastic force of the seal ring, and the seal ring can be prevented or hindered from being stuck on an open end of the port section. Along with that, smooth movement of the valve element can be achieved.

The switch valve in accordance with the present invention is disposed between the forward travel engagement device and the reverse travel engagement device and the supply valve or the discharge valve that supplies the hydraulic pressure or discharges the hydraulic pressure from the engagement devices, and the shut-in control in which the hydraulic pressure is shut in either one of the engagement devices to maintain its operational state. Further, the supply valve and the discharge valve are shared for the forward travel and the reverse travel, the number of components in a whole device can thereby be reduced, and a configuration of the whole device can thereby be simplified.

MODES FOR CARRYING OUT THE INVENTION

The present invention will next be described with reference to specific examples. A switch valve in accordance with the present invention is a valve for controlling supply and discharge of a hydraulic fluid by an operation on the basis of manual control and is used as a valve for controlling a transmission for a vehicle, for example. Thus, a typical example of the hydraulic fluid is hydraulic oil, but the hydraulic fluid in the present invention is not limited to hydraulic oil. Further, it is sufficient that the switch valve in accordance with the present invention is configured to operate on the basis of the manual control. Accordingly, the switch valve may be a valve that is coupled to an operating lever or a shift lever via a mechanical linkage or a valve that makes a switching operation by a prescribed electrical actuator that operates according to an electrical signal output on the basis of the manual control.

In the transmission for a vehicle, the valve that makes the switching operation on the basis of the manual control is a valve referred to as manual valve and is used to select or switch positions or ranges such as stop (parking), reverse travel (reverse), neutral (neutral), forward travel (drive) in a transmission such as a stepped type automatic transmission, continuously variable transmission, or a dual-clutch (twin-clutch) type transmission. Here, the stop (parking) position or range is a position or range for setting a power train from a power source to a prescribed output shaft or driving wheels to transmit no torque and stop rotation of the output shaft. The reverse travel (reverse) position or range is a position or range for setting the power train such that the output shaft or the driving wheels rotate in a reverse travel direction. Further, the neutral (neutral) position or range is a position or range for setting the power train to transmit no torque. The forward travel (drive) position or range is a position or range for setting the power train such that the output shaft or the driving wheels rotate in a forward travel direction.

Figure 1:
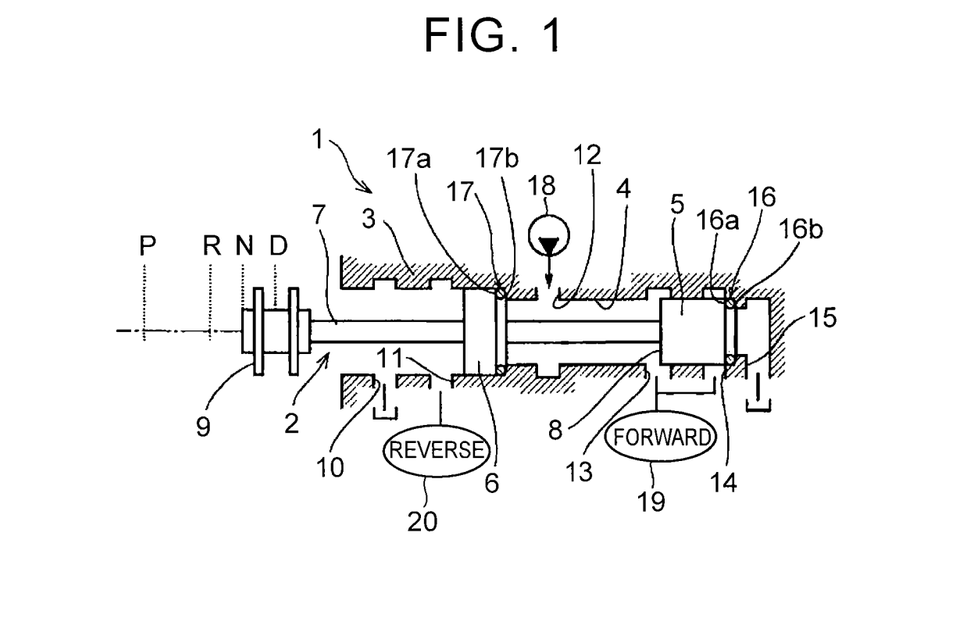
FIG. 1 is a cross-sectional view showing an example of a manual valve in accordance with the present invention.

FIG. 1 schematically shows an example of a manual valve 1 that is configured to select those positions or ranges. The example shown here is an example of a valve of a so-called spool type, and a valve element 2 is inserted in an interior of a cylinder section 4 that is formed in a valve body 3 to advance or retreat in an axial direction. The valve element 2 includes columnar or disk-shaped land sections 5, 6 in two portions of a distal end section and an intermediate section, and the land sections 5, 6 are integrally coupled by a shaft section 7. Accordingly, a section between the land sections 5, 6 serves as a valley section 8 having a smaller diameter than the land sections 5, 6. The shaft section 7 extends to a rear end section and protrudes to the outside of the cylinder section 4, and this protruding end section serves as an operation section 9 that exerts operational force on the valve element 2 in the axial direction to make the valve element 2 advance or retreat. The operation section 9 is configured to be coupled to the linkage that is coupled to the unillustrated shift lever or to be coupled to a shift actuator that electrically operates.

The cylinder section 4 is a hollow section which is formed in the valve body 3 made of metal such as aluminum or an aluminum alloy and whose one end is open. A general half (a general left half in FIG. 1) of the open end side is formed in a cylindrical shape having generally the same diameter as the above-described one land section 6, and a general half (a general left half in FIG. 1) on a distal end side is formed in a cylindrical shape generally the same as the other land section. In the example shown in FIG. 1, six ports 10, 11, 12, 13, 14, 15 are formed to open on the inner peripheral surface of the cylinder section 4. These port sections are the first drain port 10, the reverse travel port 11, the input port 12, the first forward travel port 13, the second forward travel port 14, and the second drain port 15 from the left side of FIG. 1. Each of the ports 10 to 15 is configured with an annular groove with a width narrower than the above-described land sections 5, 6 and an oil hole that opens in the annular groove.

Further, a distance between each of the ports 10 to 15 is set to a distance that enables a communication state described below. In other words, in the example shown in FIG. 1, the above-described parking position P, reverse position R, neutral position N, and drive position D are set in this order from the left side of FIG. 1. In the parking position P, the land section 5 on the distal end side moves to a position of the input port 12 and closes the input port 12. In addition, the land section 6 in the intermediate section moves to the vicinity of the open end of the cylinder section 4, as a result the reverse travel port 11 communicates with the first drain port 10, and each of the forward travel ports 13, 14 communicates with the second drain port 15.

In the reverse position R, the land section 5 on the distal end side closes the forward travel port 13, moves to a position to open the second forward travel port 14, and thus allows the second forward travel port 14 to communicate with the drain port 15. Meanwhile, the land section 6 in the intermediate section is positioned between the first drain port 10 and the reverse travel port 11. As a result, the input port 12 and the reverse travel port 11 communicate with each other via the valley section 8.

In the neutral position N, the land section 5 on the distal end side closes the forward travel port 13, half closes the second forward travel port 14, and thus allows the second forward travel port 14 to communicate with the drain port 15. Meanwhile, the land section 6 in the intermediate section passes through the reverse travel port 11, makes that partially open to the drain port 10 side, and allows the reverse travel port 11 to communicate with the first drain port 10. Accordingly, the input port 12 opens to the valley section 8 but does not communicate with any of the other ports.

In the drive position D, the valve element 2 further moves to the right in FIG. 1, the land section on the distal end side half closes the second forward travel port 14 and half closes a first forward travel port 14, and thus allows the first forward travel port 13 to communicate with the input port 12 via the valley section 8. Meanwhile, the land section 6 in the intermediate section passes through the reverse travel port 11 to allow the reverse travel port 11 to be blocked against the input port 12 and to communicate with the first drain port 10.

A switch valve 1 shown in FIG. 1 is provided with seal sections 16, 17 that seal spaces between portions on both sides in the axial direction across each of the land sections 5, 6 in a liquid-tight manner in the drive position D. Describing the seal section 16 for the land section 5 on the distal end side, a ring-shaped packing 16a with an outer diameter generally the same as the outer diameter of the land section 5 is mounted on a distal end surface of the land section 5, and a contact section in the present invention is formed in this portion. Further, an annular protrusion that protrudes to an inner peripheral side while having an inner diameter smaller than the packing 16a is formed in a portion of the inner peripheral surface of the cylinder section 4 between the second forward travel port 14 and the second drain port 15, and the protrusion serves as a valve seat 16b. In other words, the packing 16a provided on the distal end surface of the land section 5 contacts and tightly fits to the valve seat 16b, and the seal section 16 thereby seals the gap between the land section 5 and the inner peripheral surface of the cylinder section 4 in a liquid-tight manner. As a result, the seal section 16 seals the space between the portions on both of the sides in the axial direction across the land section 5 (a space on end surfaces sides of the land section 5 in the axial direction) in a liquid-tight manner.

Further, the seal section 17 for the land section 6 in the intermediate section is formed in generally the same manner as the seal section 16 for the land section 5 on the distal end side. A ring-shaped packing 17a with an outer diameter generally the same as the outer diameter of the land section 6 is mounted on a distal end surface of the land section 6 (a right end surface in FIG. 1), and a contact section in the present invention is formed in this portion. Further, an annular protrusion that protrudes to the inner peripheral side while having an inner diameter smaller than the packing 17a is formed in a portion of the inner peripheral surface of the cylinder section 4 between the reverse travel port 11 and the input port 12, and the protrusion serves as a valve seat 17b. In other words, the packing 17a provided on the distal end surface of the land section 6 contacts and tightly fits to the valve seat 17b, and the seal section 17 thereby seals the gap between the land section 6 and the inner peripheral surface of the cylinder section 4 in a liquid-tight manner. As a result, the seal section 17 seals the space between the portions on both of the sides in the axial direction across the land section 6 (a space on end surface sides of the land section 6 in the axial direction) in a liquid-tight manner. Accordingly, the outer diameter of the land section 5 on the distal end side is smaller than the outer diameter of the land section 6 in the intermediate section. In response to this, the inner diameter of the cylinder section 4 is large on the open end side on the left side in FIG. 1 and small on a closed end side on the right side.

The input port 12 communicates with a hydraulic pressure source 18. Further, each of the forward travel ports 13, 14 communicates with a forward travel actuator 19. In addition, the reverse travel port 11 communicates with a reverse travel actuator 20. The actuators 19, 20 are built in the power train of the vehicle, operate with supplied hydraulic pressure, and are for setting a power transmission path of the power train such that the vehicle performs forward travel or reverse travel. For example, the actuators 19, 20 are hydraulic actuators that are provided in a clutch that couples rotating elements together or couples the rotating elements to a prescribed fixed section, hydraulic actuators that engages a forward travel clutch and a reverse travel brake in a forward-reverse switching mechanism in the continuously variable transmission that has the forward-reverse switching mechanism, and shifting hydraulic actuators that makes synchronizers to operate in a dual-clutch type automatic transmission (DCT) that is configured to select a gear pair to which torque is transmitted from gear pairs provided for a plurality of forward travel positions and reverse travel positions.

Figure 2:
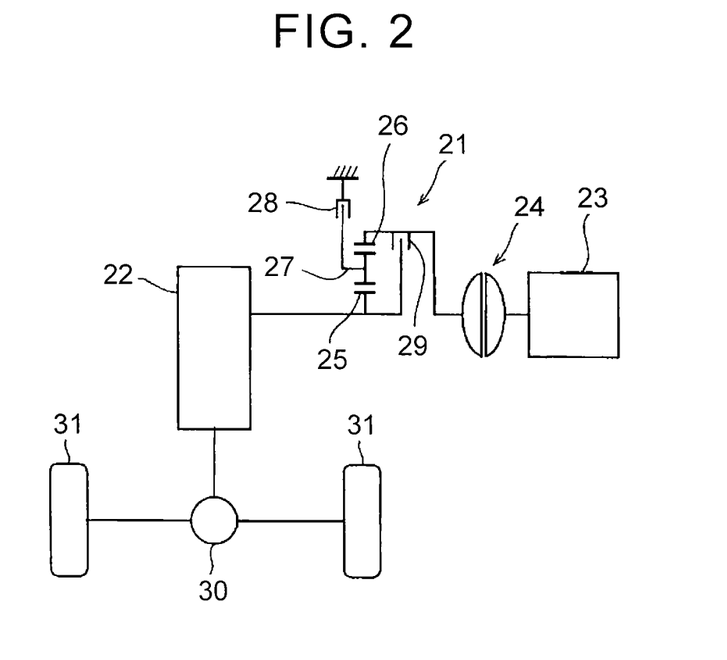
FIG. 2 is a schematic diagram showing an example of a power train for a vehicle that includes a forward-reverse switching mechanism.

FIG. 2 schematically shows an example of the power train for a vehicle in which a forward-reverse switching mechanism 21 is aligned in series with respect to a continuously variable transmission mechanism 22, in which a torque converter 24 is coupled to an output side of the engine 23 serving as a driving force source and an output member of the torque converter 24 is coupled to the forward-reverse switching mechanism 21. In the example shown in FIG. 2, the forward-reverse switching mechanism 21 is configured with a single-pinion type planetary gear mechanism as a main component. In other words, the forward-reverse switching mechanism 21 has a sun gear 25, a ring gear 26 that is concentrically disposed with respect to the sun gear 25, and a carrier 27 that holds a pinion gear that meshes with the sun gear 25 and the ring gear 26. The ring gear 26 is coupled to the output member of the torque converter 24 and serves as an input element, and the sun gear 25 is coupled to an input member of the continuously variable transmission mechanism 22 and serves as an output element. The carrier 27 is coupled to a brake 28 with which the carrier 27 is engaged by the reverse travel actuator 20 and thus serves as a reaction force element. In addition, a clutch 29 is provided that is engaged by the forward travel actuator 19 to couple the sun gear 25 and the ring gear 26 together. The output member of continuously variable transmission mechanism 22 is coupled to left and right driving wheels 31 via a differential gear 30. The brake 28 and the clutch 29 correspond to an engagement device in the present invention.

Accordingly, the forward-reverse switching mechanism 21 shown in FIG. 2 is configured such that the clutch 29 is engaged, the whole planetary gear mechanism thereby integrally rotates to set a forward travel state, further the brake 28 is engaged to fix the carrier 27, and the sun gear 25 as the output element thereby rotates in the opposite direction to the ring gear as the input element to set a reverse travel state. A mechanism for supplying the hydraulic pressure to or discharging the hydraulic pressure from the hydraulic pressure source 18 and each of the actuators 19, 20 will be described below.

A function of the above-described manual valve 1 will next be described. In the parking position P, as described above, the input port 12 is closed by the land section 5 on the distal end side, and the reverse travel port 11 communicates with the first drain port 10 to depressurize the reverse travel actuator 20. In addition, the forward travel ports 13, 14 communicate with the second drain port 15 to depressurize the forward travel actuator 19. Accordingly, because the actuators 19, 20 become a non-operational state and the power train does not transmit torque, torque is not transmitted to the driving wheels 31. Further, not particularly illustrated, a lock mechanism that stops rotation acts on the output shaft of the transmission mechanism, and rotation of the driving wheels 31 is stopped.

When the reverse range is selected and the valve element 2 moves to the reverse position R, as described above, while the second forward travel port 14 communicates with the second drain port 15 to depressurize the forward travel actuator 19, the reverse travel port 11 communicates with the input port 12 via the valley section 8 in the valve element 2. Accordingly, the hydraulic pressure is supplied to the reverse travel actuator 20, the brake 28 shown in FIG. 2 is engaged, for example, and the reverse travel state is set. In this case, if a slight gap for securing smooth advance and retreat of the valve element 2 is provided between the valve element 2 and the cylinder section 4, the hydraulic oil may slightly leak from the gap. However, because a time in which the vehicle performs reverse travel is short, energy loss due to leakage of the hydraulic oil is small, thus not resulting in a considerable problem.

In a state where the neutral position N is selected, as described above, the second forward travel port 14 communicates with the second drain port 15, and the reverse travel port 11 communicates with the first drain port 10. Accordingly, because each of the actuators 19, 20 is depressurized and becomes the non-operational state, and the power train does not transmit torque, torque is not transmitted to the driving wheels 31.

When the drive position D is selected, the valve element 2 moves to a position indicated in FIG. 1, and the packings 16a, 17a provided in the respective land sections 5, 6 are pressed to the valve seats 16b, 17b correspondently provided thereto. In other words, the seal sections 16, 17 seal the gaps between the respective land sections 5, 6 and the cylinder section 4 in a liquid-tight manner. As a result, the valley section 8 defined by the land sections 5, 6 are hermetically sealed against the other sections in the interior of the cylinder section 4. Further, as described above, the land section 5 on the distal end side closes the second forward travel port 14 and half closes the first forward travel port 14, and thus allows the first forward travel port 13 to communicate with the input port 12 via the valley section 8. Meanwhile, the land section 6 in the intermediate section passes through the reverse travel port 11 to allow the reverse travel port 11 to be blocked against the input port 12 and to communicate with the first drain port 10. Accordingly, the hydraulic pressure is supplied to the forward travel actuator 19, and the reverse travel actuator 20 is depressurized. Consequently, in the example shown in FIG. 2, the clutch 29 is engaged, and the brake 28 is disengaged, thereby setting the forward travel state. In this case, because each of the seal sections 16, 17 is closed in a liquid-tight manner, even in a case where the slight gaps for smooth movement of the valve element 2 are provided between the outer peripheral surfaces of the land sections 5, 6 and the inner peripheral surface of the cylinder section 4, the portions on both of the sides in the axial direction across each of the land sections 5, 6 are blocked in a liquid-tight manner. In other words, the valley section 8 between the two land sections 5, 6 is blocked against each of the drain ports 10, 15 and the reverse travel port 11 in a liquid-tight manner. Therefore, the hydraulic oil supplied from the hydraulic pressure source 18 to the forward travel actuator 19 does not leak, and pressure loss or energy loss during the forward travel can thus be avoided or restricted. Further, when the oil passage that communicates with the input port 12 is blocked, the hydraulic pressure can be shut in the forward travel actuator 19. Therefore, it is not required to keep supplying the hydraulic pressure for maintaining a forward travel state, and energy consumption can thus be avoided or restricted in this point.

Figure 3:
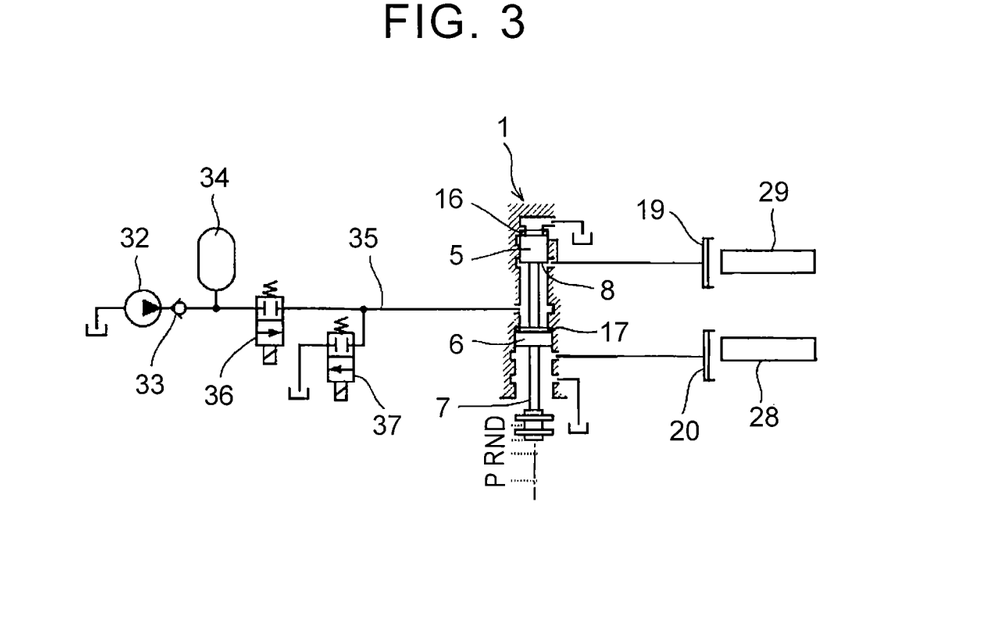
FIG. 3 is a hydraulic pressure circuit diagram showing an example of a hydraulic pressure control circuit that includes the manual valve shown in FIG. 1.

Here, descriptions will be made about a configuration of the hydraulic pressure source 18 and a configuration of the hydraulic circuit for supplying the hydraulic pressure from the hydraulic pressure source 18 to each of the actuators 19, 20 and depressurizing the actuators 19, 20. In FIG. 3, the hydraulic pressure source 18 includes a pump 32 driven by the engine 23 or an unillustrated motor and an accumulator 34 connected to an outlet of the pump 32 via a check valve 33. A supply valve 36 that is a two-way valve and is electrically controlled to be switched to an open state where an oil passage 35 is opened or a closed state where the oil passage 35 is hermetically sealed in a liquid-tight manner is interposed in the oil passage 35 that allows communication between the accumulator 34 and the input port 12 of the manual valve 1. Further, a depressurization valve 37 that is a two-way valve and is electrically controlled to be switched to an open state where the input port 12 communicates with a prescribed drain portion of the input port 12 or a closed state where the input port 12 is hermetically sealed against the drain portion in a liquid-tight manner communicates with the input port 12.

According to the hydraulic circuit shown in FIG. 3, the supply valve 36 is controlled to become the open state in a state where the manual valve 1 is set in the drive position D, the hydraulic pressure generated by the pump 32 or the hydraulic pressure stored in the accumulator 34 is supplied to the forward travel actuator 19, the clutch 29 is thereby engaged, and the forward travel state is set. Further, when the depressurization valve 37 is controlled to become the open state, because the forward travel actuator 19 communicates with the prescribed drain portion to depressurize the forward travel actuator 19, a transmission torque capacity of the clutch 29 decreases, or the clutch 29 is disengaged. In other words, engagement and disengagement of the clutch 29 can be controlled by the valves 36, 37, and the transmission torque capacity can thereby be controlled. In addition, in a state where prescribed hydraulic pressure is supplied to the forward travel actuator 19, each of the valves 36, 37 is set to the closed state, the hydraulic pressure can thereby be shut in the forward travel actuator, and an engagement state of the clutch 29 or the transmission torque capacity can be maintained. That is, shut-in control can be achieved.

Meanwhile, the supply valve 36 is controlled to become the open state in a state where the reverse position R is selected by the manual valve 1, the hydraulic pressure generated by the pump 32 or the hydraulic pressure stored in the accumulator 34 is supplied to the reverse travel actuator 20, the brake 28 is thereby engaged, and the reverse travel state is set. Further, when the depressurization valve 37 is controlled to become the open state, because the reverse travel actuator 20 communicates with the prescribed drain portion to depressurize the reverse travel actuator 20, a transmission torque capacity of the brake 28 decreases, or the brake 28 is disengaged. In other words, engagement and disengagement of the brake 28 can be controlled by the valves 36, 37, and the transmission torque capacity can thereby be controlled.

Accordingly, in a configuration shown in FIG. 3, leakage of the hydraulic pressure can be avoided or restricted, the so-called shut-in control can be achieved in the forward travel state, and energy efficiency can thereby be improved. In addition, the valve 36, 37 set the forward travel state and the reverse travel state and function to control the transmission torque capacity in each of the state. Therefore, the number of required control valves can be reduced, and a configuration of the whole device can thus be simplified and can be made small in size. Further, because the switching between the forward travel state and the reverse travel state is performed by changing the position of the valve element 2 in the manual valve 1, the hydraulic pressure is not supplied to both of the forward travel actuator 19 and the reverse travel actuator 20. Accordingly, fail safe can be achieved in the configuration shown in FIG. 3.

Figure 4:
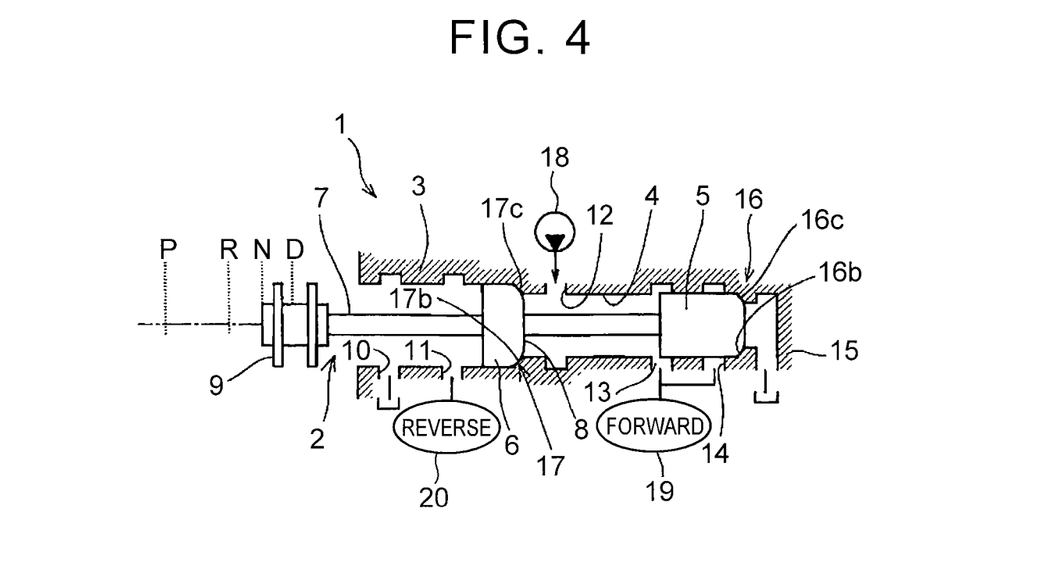
FIG. 4 is a cross-sectional view showing another example of the manual valve in accordance with the present invention.

Incidentally, it is sufficient that the valve seats and the contact sections in the present invention are configured to tightly fit on each other to achieve liquid-tight sealing in a case where the valve element 2 moves in the axial direction, and the valve seats and the contact sections are not limited to configurations with the above-described packings 17a, 16a but may be another appropriate configuration. For example, tapered surfaces may be formed in outer peripheral section on one end sides of the land sections 5, 6 in the axial direction to serve as the contact sections, and an inner peripheral end of the annular protrusion formed on the inner peripheral surface of the cylinder section 4 may be formed in a tapered shape to serve as the valve seat. Alternatively, as shown in FIG.

4, the seal sections 16, 17 may be configured such that inner peripheral surfaces of the valve seats 16b, 17b are formed in the tapered surfaces, contact sections 16c, 17c in convex surface shapes are formed on one end surfaces of the land sections 5, 6 in the axial direction that face the respective valve seats 16b, 17b, and the contact sections 16c, 17c are made contact the valve seats 16b, 17b in the tapered shapes to achieve liquid-tight sealing.

Figure 5:
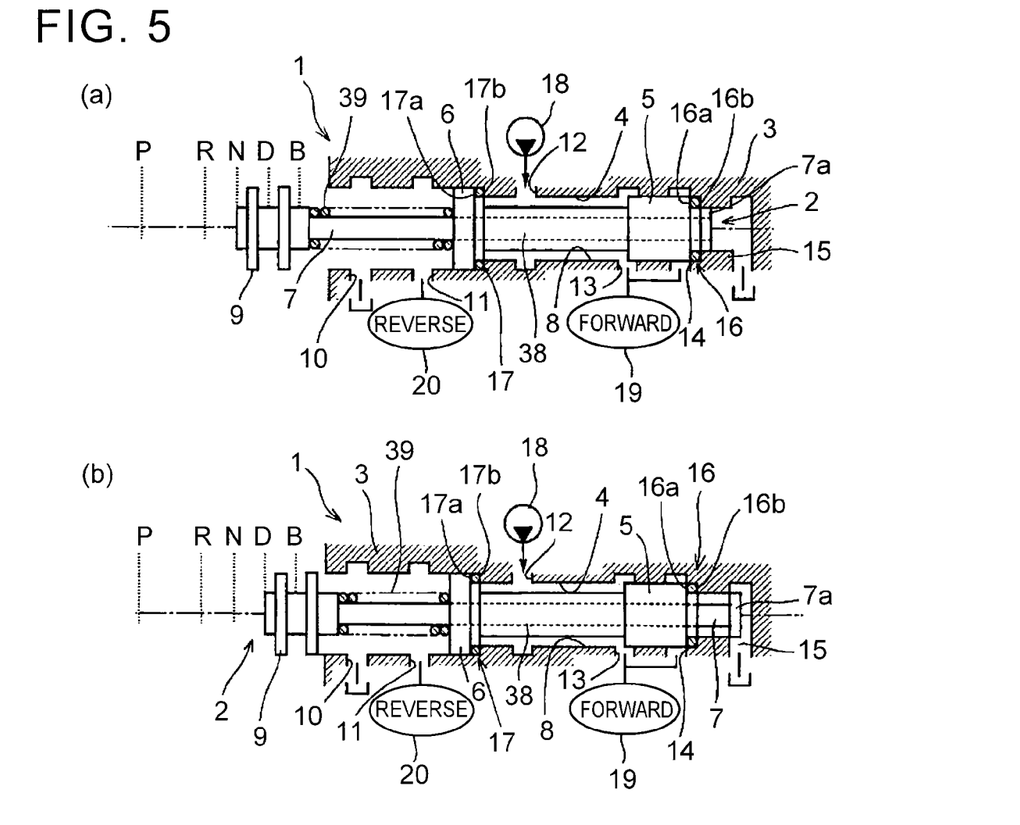
FIG. 5 are cross-sectional views showing an example where a shaft section is configured to relatively move with respect to a land section, in which (a) shows a state where setting is made in a drive position and (b) shows a state where setting is made in a brake position.
Figure 6:
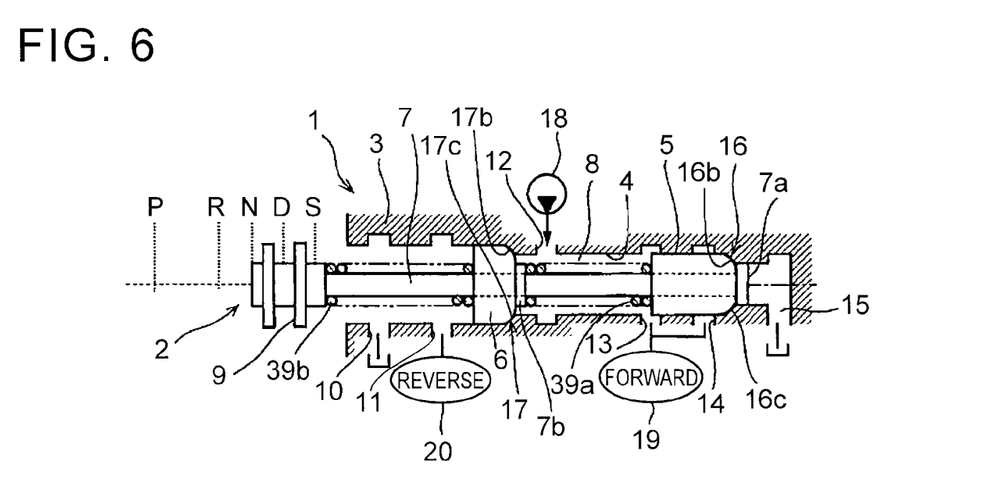
FIG. 6 is a cross-sectional view showing another example where the shaft section is configured to relatively move with respect to the land section.

Further, in the vehicle equipped with the automatic transmission, there is a case where a shift device is configured to select a position B (or S) in which an engine brake is used or gear ratios on a high speed side is limited in addition to the positions P, N, R, D for parking, neutral, reverse, drive, respectively, by controlling the shift lever. The present invention can be configured to suit such a shift device, and such examples are shown in FIGS. 5 and 6. The example shown in FIG. 5 is an example of a configuration in which the shaft section 7 can relatively move with respect to each of the above-described land sections 5, 6 shown in FIG. 1. In other words, the shaft section 7 passes through each of the land sections 5, 6 along their central axial lines, and a flange 7a that is a stopper for preventing slipping out is formed in a distal end section of the shaft section 7. Further, a cylindrical spacer 38 through which the shaft section 7 passes is disposed between the land sections 5, 6, and the spacer 38 maintains a constant distance between the land sections 5, 6. Further, a compression coil spring 39 is disposed between the land section 6 in the intermediate section and the above-described operation section 9 and presses the land section 6 to the distal end side of the shaft section 7.

Accordingly, in the manual valve 1 in the configuration shown in FIG. 5 in a state until a load that actively compresses the compression coil spring 39 is applied, that is, a state where either one of the parking position P or the drive position D is selected, each of the land sections 5, 6 and the spacer are pressed toward the distal end side of the shaft section 7 by elastic force of the compression coil spring 39, and the land section 5 on the distal end side contacts the flange 7a formed in the shaft section 7. In other words, positions of the land sections 5, 6 with respect to the shaft section 7 are defined in prescribed positions by the flange 7a and the spacer 38. Accordingly, as shown in FIG. 5(a), when the valve element 2 is moved to the drive position D, the packings 17a, 16a provided in the land sections 5, 6 contact the valve seats 17b, 16b in a liquid-tight manner. As a result, similarly to the manual valve 1 in the above-described configuration shown in FIG. 1, the valley section 8 that allows communication between the input port 12 and the forward travel port 14 is sealed against the other ports in a liquid-tight manner.

The position B in which the engine brake is used or setting in the gear ratios on the high speed side is limited (hereinafter referred to as brake position for convenience) is provided to adjoin the drive position D and selected by moving the shaft section 7 of the valve element 2 further to the distal end side (the right side in FIG. 5). Such a state is shown in FIG. 5(b). The land sections 5, 6 are prevented from advancing by the valve seats 16b, 17b as limit positions. On the other hand, the shaft section 7 passes through the land sections 5, 6 and the spacer 38 to move to the right in FIG. 5 and reaches a position set as the brake position B. In this case, because the land sections 5, 6 do not move, communication states of the ports do not change. However, selection of the brake position B is detected from changes in the positions of the shaft section 7 and the shift lever and the actuator (none shown) that move the shaft section 7. Further, on the basis of the detection result, the appropriate actuator (not shown) is operated to use the engine brake or limit the gear ratios on the high speed side.

An example shown in FIG. 6 is an example where the shaft section 7 can relatively move with respect to each of the land sections 5, 6 in the above-described configuration shown in FIG. 4. In other words, the shaft section 7 passes through each of the land sections 5, 6 along their central axial lines, and the flange 7a for preventing slipping out is formed in the distal end section of the shaft section 7. Further, a stopper 7b for defining the position of the land section 6 is provided in an intermediate section of the shaft section 7. A compression coil spring 39a is disposed between the stopper 7b and the land section 5 on the distal end side, and a compression coil spring 39b is disposed between the land section 6 in the intermediate section and the above-described operation section 9. Accordingly, the land section 5 on the distal end side is pressed toward the flange 7a by the compression coil spring 39a, and the land section 6 in the intermediate section is pressed toward the stopper 7b by the other compression coil spring 39b.

Accordingly, in the manual valve 1 in the configuration shown in FIG. 6 in a state until loads that actively compress the compression coil springs 39a, 39b are applied, that is, a state where either one of the parking position P or the drive position D is selected, each of the land sections 5, 6 is pressed toward the distal end side of the shaft section 7 by elastic force of the compression coil springs 39a, 39b, the land section 5 on the distal end side contacts the flange 7a formed in the shaft section 7, and the land section 6 in the intermediate section contacts the stopper 7b. In other words, the positions of the land sections 5, 6 with respect to the shaft section 7 are defined in prescribed positions by the flange 7a and the stopper 7b. Accordingly, as shown in FIG. 6, when the valve element 2 is moved to the drive position D, the packings 17a, 16a provided in the land sections 5, 6 contact the valve seats 16b, 17b in a liquid-tight manner. As a result, similarly to the manual valve 1 in the above-described configuration shown in FIG. 4, the valley section 8 that allows communication between the input port 12 and the forward travel port 14 is sealed against the other ports in a liquid-tight manner.

A position S in which the engine brake is used or setting in the gear ratios on the high speed side is limited (hereinafter referred to as sub position for convenience) is provided to adjoin the drive position D and selected by moving the shaft section 7 of the valve element 2 further to the distal end side from the drive position D. In such a state, the land sections 5, 6 are prevented from advancing by the valve seats 16b, 17b. On the other hand, the shaft section 7 passes through the land sections 5, 6 to move to the right in FIG. 6 and reaches a position set as the sub position S. In this case, because the land sections 5, 6 do not move, the communication states of the ports do not change. However, selection of the sub position is detected from changes in the positions of the shaft section 7 and the shift lever and the actuator (none shown) that move the shaft section 7. Further, on the basis of the detection result, the appropriate actuator (not shown) is operated to use the engine brake or limit the gear ratios on the high speed side.

Figure 7:
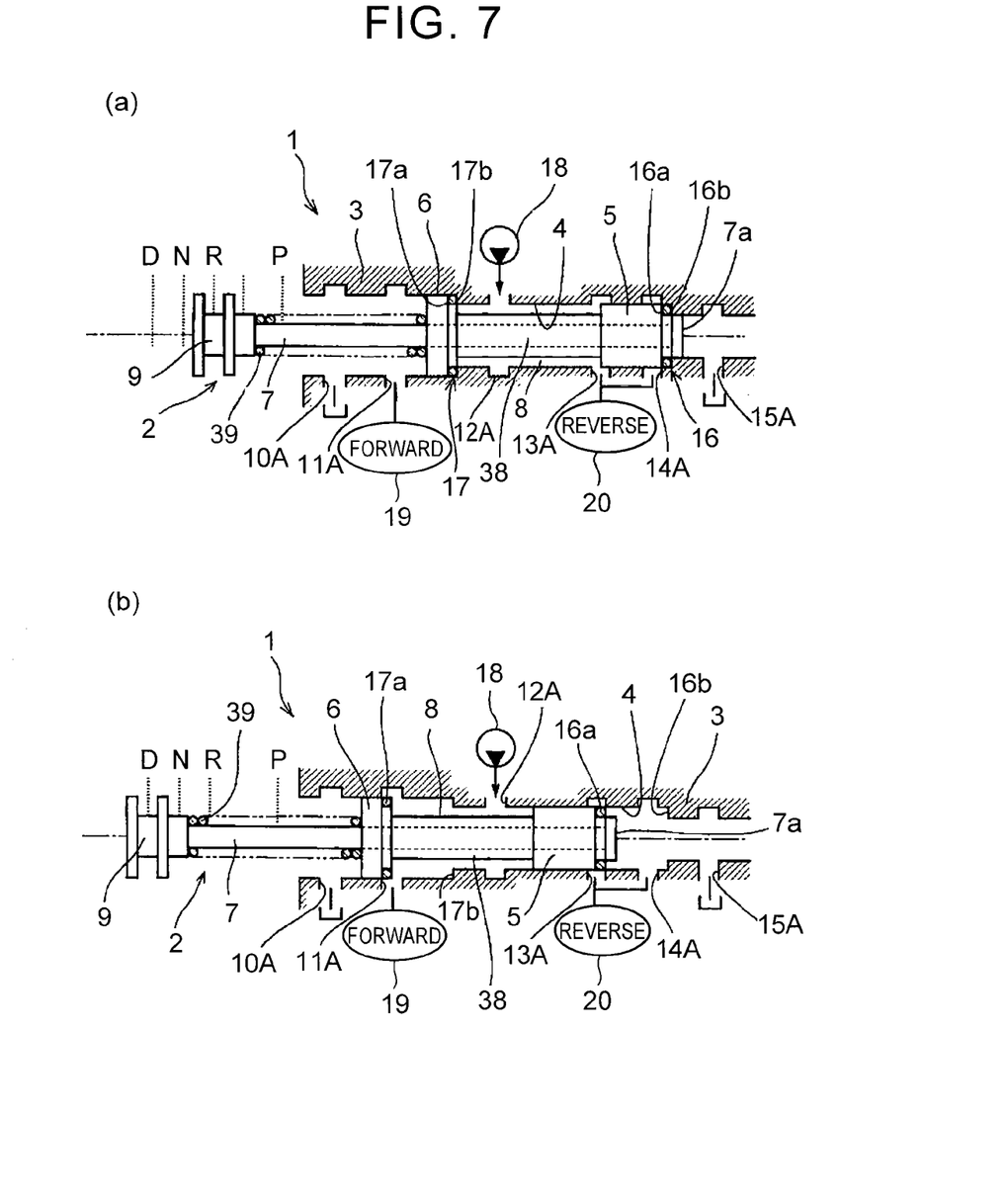
FIG. 7 are cross-sectional views showing an example of the manual valve in which an alignment of the drive position, a neutral position, a reverse position, and a parking position is made opposite to the example shown in FIG. 5, in which (a) shows a state where setting is made in the drive position and (b) shows a state where setting is made in a reverse position.

As described above, in a case where a configuration is made such that the land sections 5, 6 can relatively move with respect to the shaft section 7, the shaft section 7 can further be moved even if the movement of the land sections 5, 6 is restricted by the seal sections 16, 17. By utilizing such a function, the alignment of the positions P, N, R, D can be made opposite to the alignment shown in FIG. 1 or FIG. 4. Such an example is shown in FIG. 7. The example shown there is where the above-described configuration is partially modified and the drive position D, the neutral position N, the reverse position R, and the parking position P are set from the left in FIG. 7.

Further, as ports that open on the inner peripheral surface of the cylinder section 4, a first drain port 10A, a forward travel port 11A, an input port 12A, a first reverse travel port 13A, a second reverse travel port 14A, and a second drain port 15A are provided from the left in FIG. 7. The hydraulic pressure is supplied to the input port 12A from the hydraulic pressure source 18, and the hydraulic pressure is discharged to a prescribed drain portion. Further, the forward travel port 11A communicates with the forward travel actuator 19, and the reverse travel ports 13A, 14A communicate with the reverse travel actuator 20.

In addition, distances or positions from each of the ports 10A to 15A are set such that communication states described below are enabled. In other words, in the drive position D, the land section 6 in the intermediate section is positioned between the first drain port 10A and the forward travel port 11A, and the input port 12 and the forward travel port 11A communicate with each other. Further, the land section 5 on the distal end side is positioned between the input port 12 and the first reverse travel port 13A, the reverse travel ports 13A, 14A are blocked against the input port 12, and the second reverse travel port 14A communicates with the second drain port 15A. This state is shown in FIG. 7(*b*). In the drive position D, the packings 16*a*, 17*a* provided in the respective land sections 5, 6 are separated from the valve seats 16*b*, 17*b*, and the seal sections 16, 17 do not perform sealing.

In the neutral position N, the land section 6 in the intermediate section moves to a position in which the forward travel port 11A opens on the first drain port 10A, and the forward travel port 11A communicates with the first drain port 10A. Further, the land section 5 on the distal end side moves to a position in which the first reverse travel port 13A is closed and the second reverse travel port 14A opens on the drain port 15A side, and the second reverse travel port 14A communicates with the second drain port 15A.

In the reverse position R, the land section 5 on the distal end side makes the first reverse travel port 13A open on the input port 12A side and makes the second reverse travel port 14A close, the packing 16*a* provided in the land section 5 contacts the valve seat 16*b*, and the seal section 16 thereby performs sealing in a liquid-tight manner. On the other hand, the land section 6 in the intermediate section moves to a section between the forward travel port 11A and the input port 12A to block the ports 11A, 12A, at the same time the packing 17*a* provided in the land section 6 contacts the valve seat 17*b*, and the seal section 17 thereby performs sealing in a liquid-tight manner. Accordingly, the input port 12A and the reverse travel port 14A communicate with each other via the valley section 8, and at the same time the valley section 8 is sealed against the other ports in a liquid-tight manner. Thus, leakage of the hydraulic oil in the manual valve 1 is avoided or restricted in the reverse travel state, and the so-called shut-in control of the hydraulic pressure can be achieved. This state is shown in FIG. 7(*a*).

In the parking position P, the shaft section 7 is moved further to the right in FIG. 7. In such a case, because the movement of the land sections 5, 6 is inhibited by the valve seats 16*b*, 17*b*, the communication states of the ports in the manual valve 1 do not change. On the other hand, the shaft section 7 and the shift lever or the appropriate actuator (none shown) that operate the shaft section 7 move to a position that corresponds to the parking position P. Therefore, control for the parking state is made by detecting the positions. For example, a discharge valve 37 shown in FIG. 3 is controlled to become the open state to depressurize the reverse travel actuator 20, and at the same time an appropriate lock mechanism (not shown) operates to stop rotation of the driving wheels 31.

Accordingly, in a case where a configuration is made as shown in FIG. 7, the shut-in control of the hydraulic pressure can be achieved in the reverse travel state, and energy loss due to leakage of the hydraulic pressure or continuous supply of the hydraulic pressure can be avoided or restricted. Further, similarly to the examples shown in FIGS. 1, 4, 5, and 6, because the configuration shown in FIG. 7 allows provision of the slight gap between the outer peripheral surfaces of the land sections 5, 6 and the inner peripheral surface of the cylinder section 4, sticking of the valve element 2 can be prevented, and the valve element 2 can smoothly advance and retreat.

Figure 8:
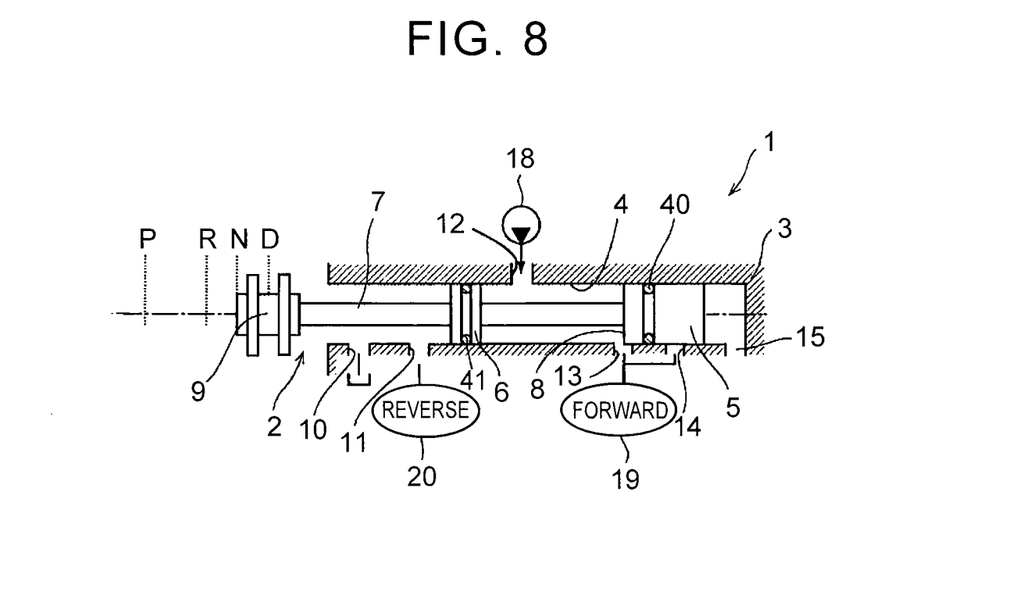
FIG. 8 is a cross-sectional view showing an example of the manual valve in which a seal section is configured with a seal ring that is fitted on an outer peripheral side of the land section.

Yet another example of the manual valve 1 in accordance with present invention will be described. The seal section in the present invention can be configured with a seal ring that slidably contacts the inner peripheral surface of the cylinder section 4 in a liquid-tight manner other than the configuration in which the packing tightly fits on the valve seat for sealing in a liquid-tight manner. Such an example is shown in FIG. 8. The example shown there is where the configurations of the seal sections and the ports are modified. Accordingly, configurations that are the same as or common to the configuration shown in FIG. 1 are provided with the same numerals and symbols as ones in FIG. 1. The valve element 2 of the manual valve 1 shown in FIG. 8 includes the land sections 5, 6 in two sections that are the distal end section and the intermediate section of the shaft section 7, diameters of the land sections 5, 6 are set the same, an inner diameter of the cylinder section 4 is constant through a whole length. Annular grooves are formed in outer peripheral sections of the land sections 5, 6, and seal rings 40, 41 are fitted in the annular grooves. The seal rings 40, 41 are configured to slidably contact the inner peripheral surface of the cylinder section 4 by own elastic force in a liquid-tight manner, fit on inner side walls of the annular grooves, and thereby seal gaps between the outer peripheral surface of the land sections 5, 6 and the inner peripheral surface of the cylinder section 4 in a liquid-tight manner.

Figure 9:
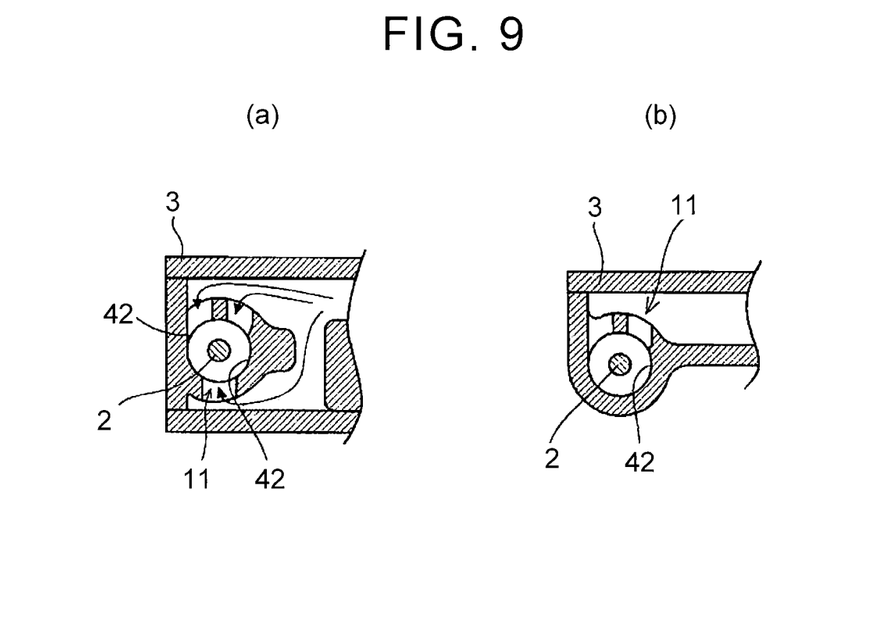
FIG. 9 are cross-sectional views, in which each of (a) and (b) shows an example of a port that includes an outer diameter restriction section that restricts an increase in an outer diameter of the seal ring.

Further, each of the ports 10 to 15 is configured such that the seal rings 40, 41 are not stuck on an open end of the port when the valve element 2 together with the seal rings 40, 41 move in the axial direction. Specifically, an outer diameter restriction section is provided that contacts outer peripheral surfaces of the seal rings 40, 41 to prevent the outer diameters of the seal rings 40, 41 from becoming an inner diameter of the cylinder section 4 or larger. Such an example is shown in FIG. 9. In the example shown in FIG. 9(*a*), the ports (the reverse travel port 11 is shown as a representative example) do not have the above-described annular grooves and are formed as opening holes that open in two upper portions and one bottom portion. A remaining section in a circumferential direction that does not include the opening holes serves as an outer diameter restriction section 42 that contacts at least two portions that face each other in a diameter direction of the seal ring 40, 41.

Further, an example shown in FIG. 9(*b*) is formed as an opening hole that opens in upper two portions. A range shown in FIG. 9(*b*) where the opening holes are provided is a range whose opening angle about a central section of the valve element 2 is smaller than 180 degrees. Accordingly, a remaining section in the circumferential direction that does not include the opening holes serves as the outer diameter restriction section 42 that contacts at least two portions that face each other in the diameter direction of the seal rings 40, 41.

Consequently, because elastic force that is exerted in a direction that increases the outer diameters of the seal rings 40, 41 is born by the diameter restriction section 42, even if the seal rings 40, 41 move to the positions of the ports, the outer diameters are maintained at the same dimension as the inner diameter of the cylinder section 4, and as a result the seal rings 40, 41 are prevented from being stuck on the open ends of the ports. Accordingly, in the configurations shown in FIGS. 8 and 9, liquid-tightness between the outer peripheral surfaces of the land sections 5, 6 of the valve element 2 and the inner peripheral surface of the cylinder section 4 can be secured, and the valve element 2 can smoothly be moved along the inner peripheral surface of the cylinder section 4 in the axial direction.

Figure 10:
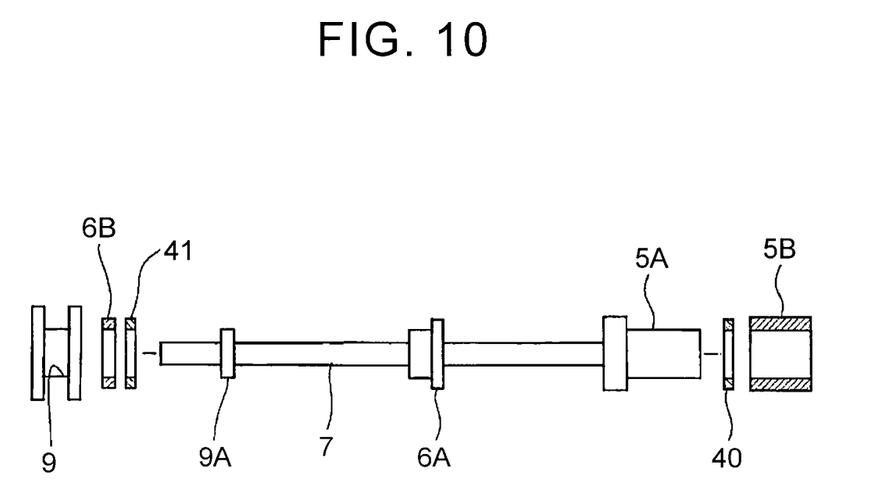
FIG. 10 is exploded view showing an example of a valve element in which the land section is formed as a split structure.

Here, the seal rings 40, 41 will further be described. The seal rings 40, 41 may be formed of a flexible elastic material or may be formed of a hard material. In a case where the seal rings 40, 41 are formed of a flexible material or formed in partially cut annular shapes, those are elastically expanded such that their inner diameters are the outer diameters of the land sections 5, 6 or larger. The seal rings 40, 41 are fitted in the annular grooves of the land sections 5, 6 in such a state and may thereby be attached to the land sections 5, 6. On the other hand, in the seal rings 40, 41 that have no cut portions and cannot be expanded, the land sections 5, 6 are formed as split structures, and the seal rings 40, 41 are preferably attached between respective split segments. Such an example is shown in FIG. 10. The land section 5 on the distal end side includes the flange and a base section 5A formed of a boss that has an outer diameter approximately the same as the inner diameter of the seal ring 40 and extends from the flange to the distal end of the shaft section 7. The base section 5A is integrally formed with the shaft section 7. Further, the land section 5 includes a ring member 5B that is fitted on the boss and forms an annular groove between the ring member 5B and the flange in the base section 5A. Accordingly, the seal ring 40 is fitted on the boss of the base section 5A, the ring member 5B is thereafter mounted on the boss by means of press-fitting, shrink-fitting, or the like, and the land section 5 on which the seal ring 40 is fitted can thereby be configured.

Meanwhile, similarly to the land section 5 on the distal end side, the land section 6 in the intermediate section includes the flange and a base section 6A formed of a boss that has an outer diameter approximately the same as the inner diameter of the seal ring 41 and extends from the flange to the operation section 9 side. The base section 6A is integrally formed with the shaft section 7. Further, the land section 6 includes a ring member 6B that is fitted on the boss and forms an annular groove between the ring member 6B and the flange in the base section 6A. The operation section 9 is detachably configured with respect to the shaft section 7. A stopper segment 9A that has a smaller outer diameter than inner diameters of the seal ring 41 and the ring member 6B is provided on an end side. After the operation section 9 is fitted on the shaft section 7 in a state where the operation section 9 abuts on the stopper segment 9A, the operation section 9 is fixed to the shaft section 7 by means of caulking or the like. Accordingly, the seal ring 41 is delivered from one end side (the left end side in FIG. 10) of the shaft section 7 and fitted on the boss of the base section 6A, the ring member 6B is thereafter mounted on the boss by means of press-fitting, shrink-fitting, or the like, and the land section 6 on which the seal ring 41 is fitted can thereby be configured.

It should be noted that the present invention is not limited to the above-described specific examples, but the valve element may be provided with the single or three or more land sections. Further, the two or more seal rings may be provided in each of the land sections.

The invention claimed is:

1. A switch valve which is configured such that a plurality of land sections and a valley section between the land sections are formed in a valve element that advances or retreats in an axial direction according to a manual operation, a plurality of port sections are provided in a cylinder section in which the valve element is inserted so as to be configured to advance or retreat, and the prescribed port sections are made to communicate with each other via the valley section according to a position of the valve element in the axial direction or be blocked by the land section, wherein
   a seal section is provided in each of the two land sections that define the valley section,
   the plurality of port sections include an input port and an output port that open to the valley section in a state where the seal sections seal gaps between the respective land sections and the cylinder section in a liquid-tight manner,
   the output port includes a forward travel port that communicates with a forward travel engagement device and a reverse travel port that communicates with a reverse travel engagement device,
   the seal section is configured to seal the gaps between the two land sections and the cylinder section in a liquid-tight manner in a state where either one of the forward travel port and the reverse travel port and the input port are both allowed to open to the valley section,
   the valve element is configured to be moved to a position where both the forward travel port and the input port are allowed to open to the valley section and a position where both the reverse travel port and the input port are allowed to open to the valley section, and
   a supply-discharge oil passage which has a supply valve that makes the input port communicate with a hydraulic pressure source and be blocked against the hydraulic pressure source and a discharge valve that makes the input port communicate with a drain portion and be blocked against the drain portion communicates with the input port.

2. The switch valve according to claim 1,
   wherein the seal section includes:
   an annular valve seat that protrudes from an inner peripheral surface of the cylinder section toward a central section of the cylinder section; and
   a contact section that is pressed to the valve seat to tightly fit thereon in a liquid-tight manner when the valve element moves in the axial direction and is formed in the land section.

3. The switch valve according to claim 2, wherein the valve seat is configured with a ring-shaped member made of an elastic material.

4. The switch valve according to claim 2, wherein the valve seat and the contact section include respective tapered surfaces that tightly fit on each other.

5. The switch valve according to claim 1,
   wherein the valve element includes a shaft section on which the land section is mounted and which can relatively move with respect to the land section in the axial direction, and
   the land section is mounted on the shaft section such that the land section can move from a prescribed limit position in the shaft section in one direction in the axial direction and cannot move from the limit position in the other direction.

6. The switch valve according to claim 1,
   wherein the seal section includes a seal ring that contacts an inner peripheral surface of the cylinder section in a liquid-tight manner by elastic force that acts to increase an outer diameter of the seal ring, and the port sections include an outer diameter restriction section that contacts at least two portions of an outer peripheral surface of the seal ring that face each other in a diameter direction and maintains the outer diameter of the seal ring to an inner diameter of the cylinder or smaller.

* * * * *